United States Patent [19]

Kwan et al.

[11] 3,970,506

[45] July 20, 1976

[54] MAGNETIC PATCH ARRANGEMENT APPARATUS

[75] Inventors: Okum Kwan, Trumbull; William A. Ottersen, Norwalk, both of Conn.

[73] Assignee: Bunker Ramo Corporation, Oak Brook, Ill.

[22] Filed: July 23, 1974

[21] Appl. No.: 491,022

[52] U.S. Cl. .............................. 156/351; 156/358; 156/361; 156/364; 156/366; 156/542; 156/556; 156/580

[51] Int. Cl.$^2$ .............................. B32B 31/04

[58] Field of Search .......... 156/249, 351, 363, 364, 156/366, 541, 542, 358, 361, 556, 580

[56] References Cited

UNITED STATES PATENTS

| | | | |
|---|---|---|---|
| 3,405,021 | 10/1968 | Marano | 156/542 |
| 3,436,294 | 4/1969 | Marano | 156/542 |
| 3,690,996 | 9/1972 | Runzi | 156/542 |
| 3,721,601 | 3/1973 | Pituch et al. | 156/542 |
| 3,729,362 | 4/1973 | French et al. | 156/542 |
| 3,785,909 | 1/1974 | Stageberg | 156/541 |
| 3,833,448 | 9/1974 | Gates et al. | 156/542 |

FOREIGN PATENTS OR APPLICATIONS

| | | |
|---|---|---|
| 1,162,228 | 9/1958 | France |
| 1,268,015 | 6/1961 | France |
| 2,044,673 | 4/1971 | Germany |
| 1,963,390 | 7/1970 | Germany |

*Primary Examiner*—William A. Powell
*Assistant Examiner*—Basil J. Lewris
*Attorney, Agent, or Firm*—Thomas G. Devine; F. M. Arbuckle

[57] ABSTRACT

The following specification describes apparatus for successively applying magnetic patches on a tape to successive passbooks. Each passbook is moved in sequence to engage a switch and is then stopped. The switch operates a solenoid, which engages a roller with the passbook and disengages the stop. Thereafter, a metered pulse is applied to the motor of a rotary drive to move the passbook and tape through the same distance and one patch is separated from the tape and applied to the passbook by the solenoid engaged roller. As the tape moves under control of the metered pulse, a succeeding patch on the tape is sensed by a photocell to maintain the motor and rotary drive operated. The drive continues to advance the tape and when the succeeding patch is no longer sensed by the photocell, it provides a signal to deenergize the motor and stop the tape. The succeeding patch is thus accurately positioned for application to the next passbook operating the switch.

12 Claims, 7 Drawing Figures

MAGNETIC PATCH
36
BROWN LINER
36a
36b
36c
36d
24
OXIDE COATING
ADHESIVE
POLYESTER FILM
ADHESIVE
BROWN LINER 75
68
54
30
28
24
47
47a
36
34
POWER SUPPLY 32
38
36
MAGNETIC PATCH PATH
INTERRUPTOR
47
47a
40
42
34
36
46
BOTTOM GUIDE BLOCK
47
24
EXIT THROUGH HOUSING
CARRIER TAPE DRIVE ROLLER
SOLENOID
54
56
PRESSURE ROLLER LINK
62
64
66
28 SWITCH ACTUATOR
58
60
PRESSURE ROLLER
26
PASSBOOK DRIVE ROLLER (KNURLED)

MAGNETIC PATCH ARRANGEMENT APPARATUS

BACKGROUND OF THE INVENTION

1. Field of the Invention

This invention relates in general to patch applicator apparatus and more particularly to magnetic patch attachment apparatus for separating a magnetic patch from a tape and applying the patch to another material such as the liner of a passbook.

2. Summary of the Prior Art

Magnetic patches comprise an oxide material and each patch is releasably carried in a longitudinally spaced successive position on a tape for application to respective passbooks, for example. In applying a magnetic patch, strip or segment to each passbook, it is necessary that the patch and tape separate properly and that the position and movement of the patch be synchronized with the position and movement of each passbook for properly engaging each patch with a successive passbook in a predetermined location.

The separation of the patch from the tape together with proper positioning of the patch relative the passbook, has heretofore been difficult to provide economically and efficiently.

SUMMARY OF THE INVENTION

In the present invention, the magnetic patches are releasably carried on a tape, which moves along two paths, one of which has a sharp or reverse bend at the juncture of the two paths to separate the patch from the tape. Each passbook is moved to engage a stop in a predetermined position adjacent the juncture and its position is sensed by a switch, while the passbook is held stationary by the stop.

The switch operates a solenoid after a perdetermined period of time to disengage the stop and engage a roller with the passbook. Thereafter the motor of a rotary drive is energized by a metered pulse to advance the tape and passbook by identical increments, while a patch at the juncture separates from the tape and is applied to the passbook by the solenoid moved roller. While both the passbook and tape are synchronously advanced the same distance, a patch succeeding the patch applied to the passbook is sensed by a photocell, which provides a signal for maintaining the motor of the rotary drive energized to continue to advance the tape and passbook. The succeeding patch moves with the tape and as soon as it passes from between the photocell and its light source a signal is generated to terminate energization of the motor of the rotary drive and the solenoid. The succeeding patch is now accurately positioned for application to another passbook, while the stop is repositioned for holding the next passbook to engage the switch. Thus the tape and passbook move synchronously and a length of tape sufficient to apply each patch to the passbook in a proper position is moved past the juncture with each succeeding patch positioned for proper application to a succeeding passbook.

The drive comprises rotatable identically sized rollers operated by a common motor for moving the rollers at the same speed and through the same distance to advance the tape and passbook by the same increment.

It is therefore a primary object of the present invention to provide an improved and more economical patch applicator apparatus.

Other objects and features of the present invention will become apparent on examination of the following specification and claims together with the drawings.

DESCRIPTION OF THE INVENTION

Figure 1:
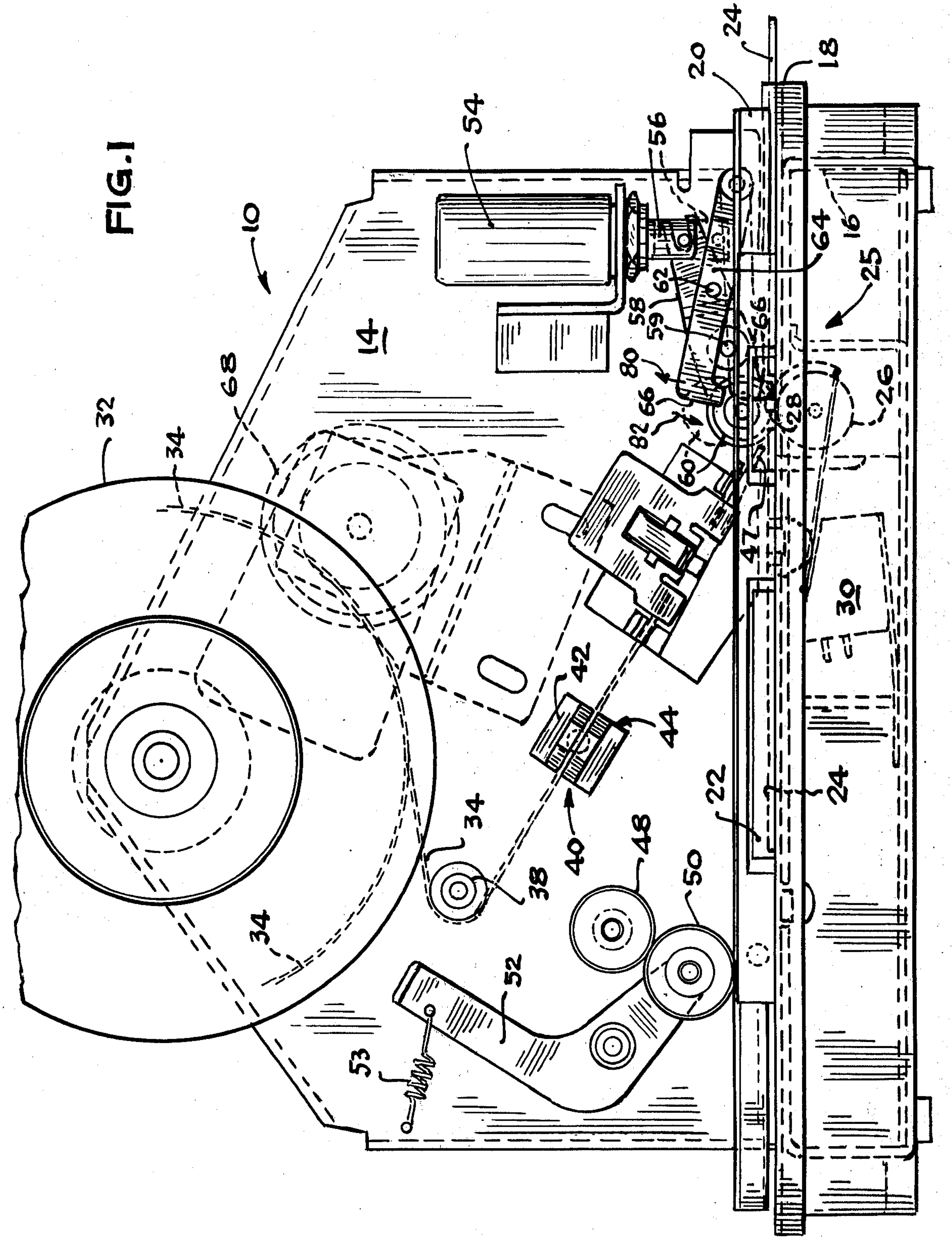
FIG. 1 is a front elevational view of the applicator apparatus with the stop and pressure roller shown in their operated positions.

Referring to the drawings, a patch applicator assembly or machine is indicated in FIG. 1–4 by the reference character 10. The applicator assembly 10 comprises a base assembly 12 on which a vertical standard 14 is supported.

Figure 2:
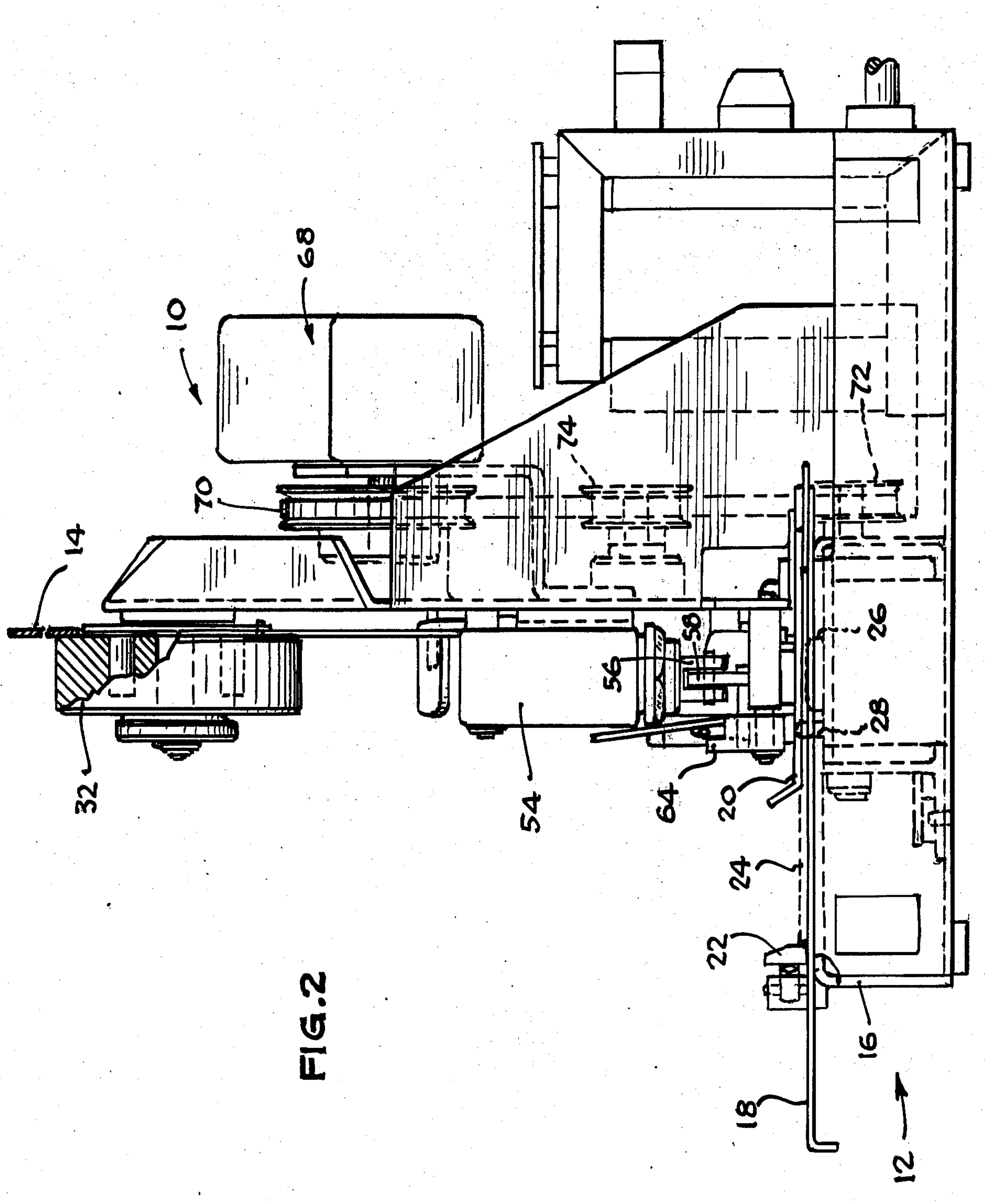
FIG. 2 is a side elevational view of the applicator apparatus.
Figure 3:
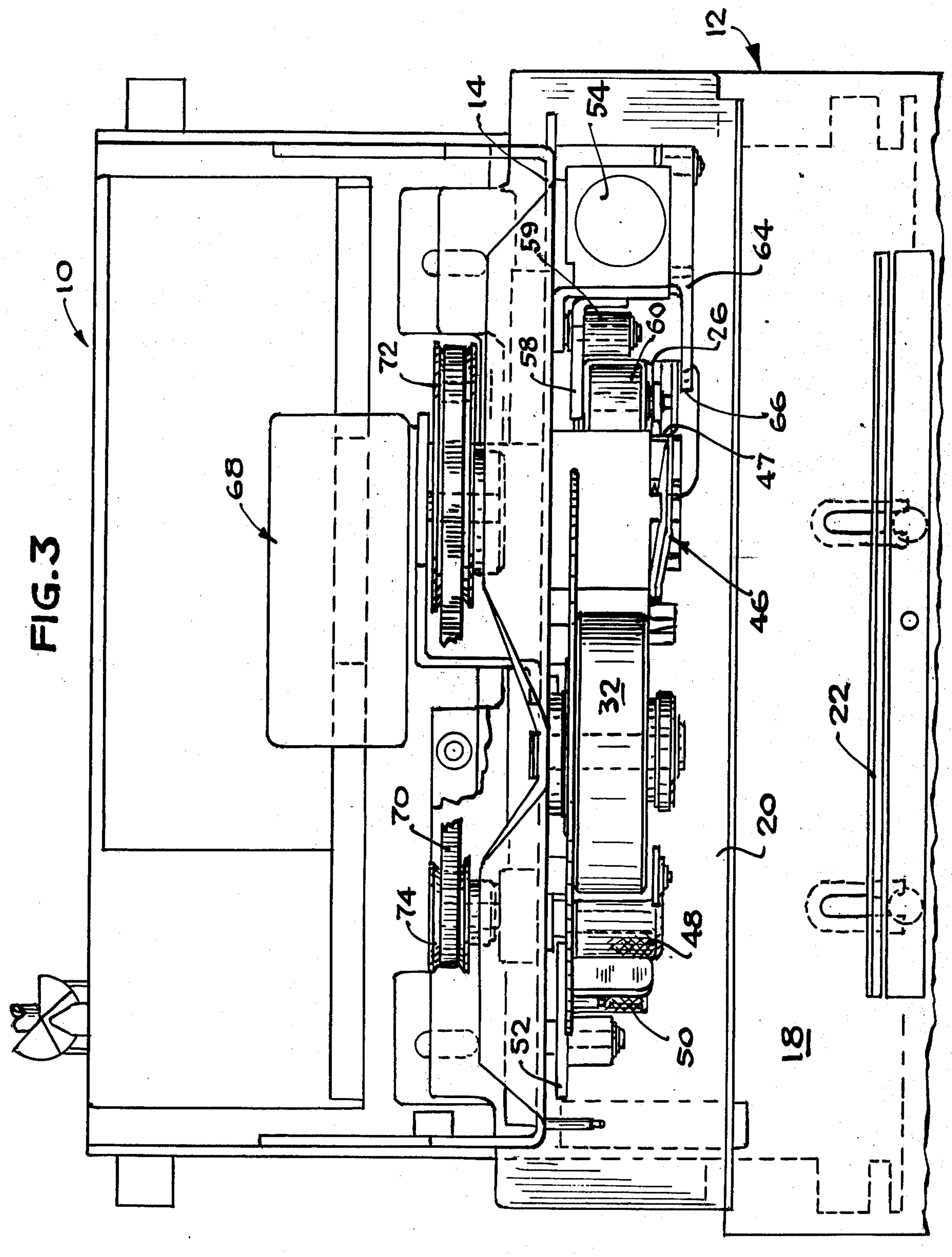
FIG. 3 is the top elevational view of the applicator apparatus.
Figure 4:
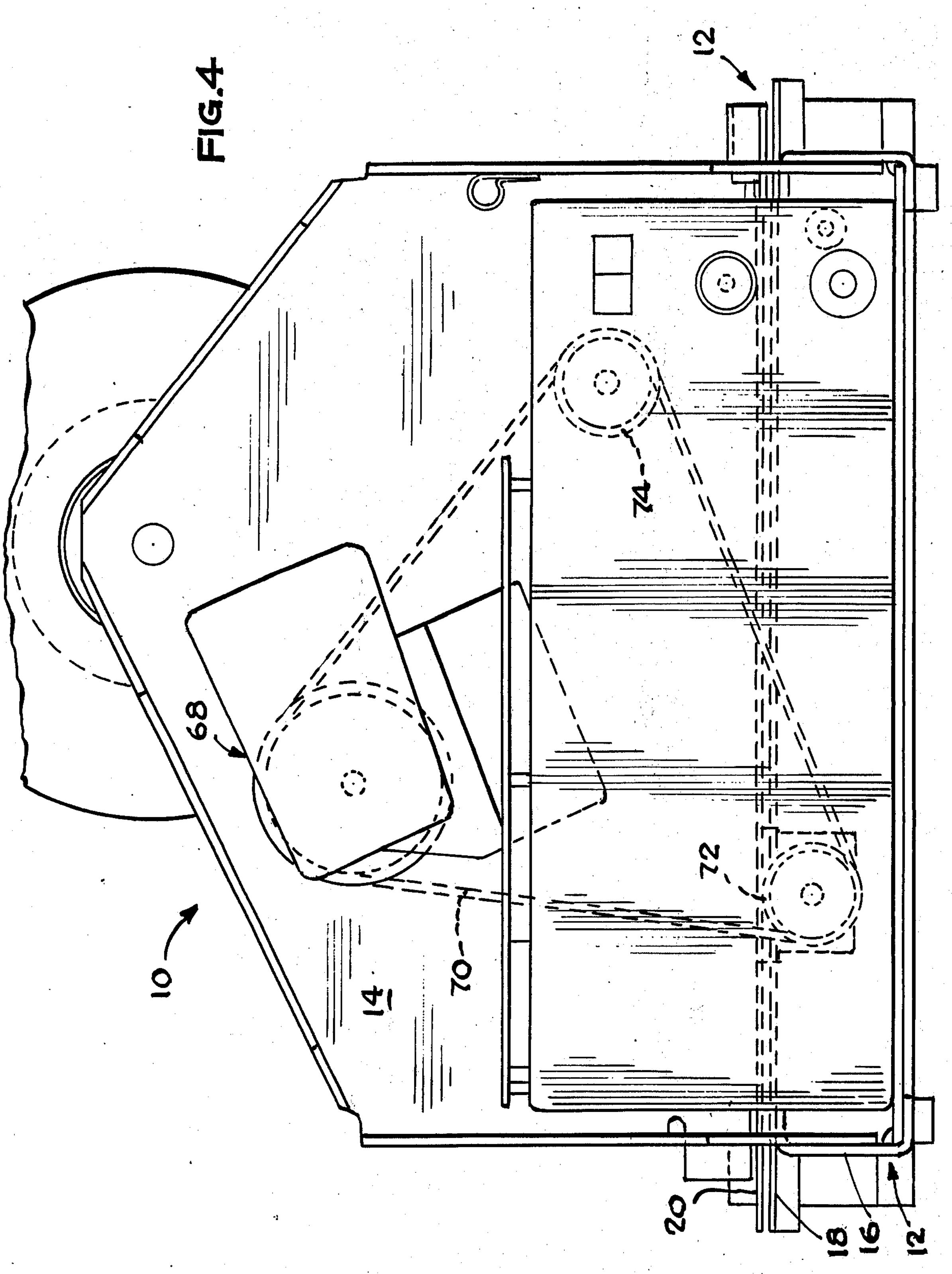
FIG. 4 is the rear elevational view of the applicator apparatus.

The base assembly 12 includes a frame 16 which carries adjacent the upper surface thereof a pair of spaced lower and upper guide or positioner plates 18 and 20 respectively and an adjustably positioned spring biased side guide 22 spaced from the upper plate 20. The guide plates 18 and 20 and guide 22 are spaced as seen in FIGS. 1, 2 and 3 to form a passageway intermediate the ends of the guide plates and guide for receiving a passbook 24 which is inserted in the space between plate 20 and guide 22 and then moved toward the right, as seen in FIG. 1, towards a patch applicator station 25 adjacent the right end of base 16 with the guide 22 engaging one longitudinal edge or side margin of the passbook 24. The passbook is inserted between plates 18 and 20 with the open side facing to the right as seen in FIG. 2 until the open side engages a stop with the closed end or margin engaging guide 22 so that the book is accurately positioned. The passbook 24 comprises a conventional passbook having opposite covers or liners of a fabric or paper material and leaves or pages therebetween.

A passageway is provided in the upper wall of frame 16 and in both the lower guide plate 18 and the upper guide plate 20 adjacent the patch applicator station 25. The knurled periphery of a passbook drive roller 26 rotatably supported on a bracket beneath the upper wall of the frame 16 and a spring biased cam operating lever or actuating arm assembly 28 of a switch 30 located beneath the upper wall of the frame 16 extend into the passageway for respective engagement with the lower side of the passbook and the front or leading edge of the passbook.

Figures 5, 6, 7:
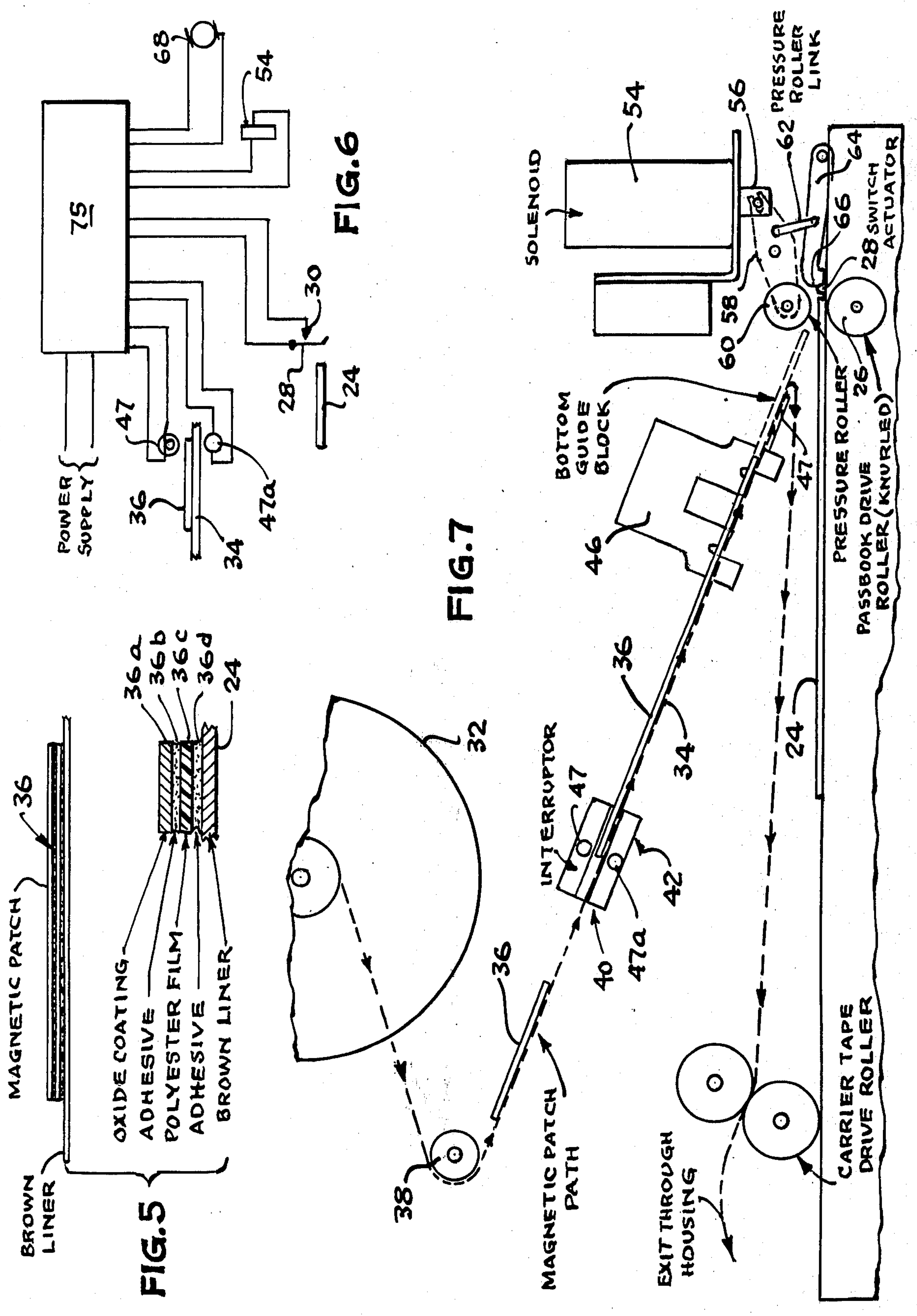
FIG. 5 is a side elevational view of the patch on the passbook liner together with a fragmentary enlarged view thereof.
FIG. 6 is a circuit schematic illustrating one circuit control arrangement for the applicator apparatus.
FIG. 7 is a schematic view illustrating the advance of the tape and passbook.

The vertical standard 14 adjacent its upper end rotatably carries a reel 32 on which a tape 34 is wound. The tape 34 is coated with a conventional release agent and carries on one surface a plurality of magnetic patches or strips 36, which are spaced longitudinally along the tape 34. As seen in FIG. 5, each patch 36 comprises a sandwich having a top layer formed of a magnetic oxide **36*a* having an adhesive coat or film 36*b* on the lower side thereof. A polyester film 36***c* is located on the underside of the film 36*b* and an adhesive coat or film 36*d* located beneath the film 36*c* serves to adhere the patch to either the tape 34 on the liner of passbook 24.

The standard 14 also carries a rotatable idler or guide roller 38 beneath reel 32, an interrupter station 40 which includes a photocell assembly 42 in a guide block assembly 44 and an adjustably positioned guide block assembly 46 adjacent the patch applicator station 25. The tape 34 will thus follow a path from the roller 38 through the photocell assembly 42, which includes a lamp 47 and a photocell 47*a* of the photoresistive or photovoltaic type and seen in FIG. 6 for sensing the patch 36 as it passes through assembly 44. Assembly 46 includes spring tensioning means for the tape and a nose guide plate 47 which extends to just above and to the left of the periphery of roller 26 at the patch applicator station 25.

Additionally, the vertical standard 14 carries adjacent the left end thereof and beneath the reel 32, a pair of tape drive rollers 48 and 50 with roller 50 being carried on a pivotable arm 52 and biased against roller 48 by a spring 53. When the roller 48 is rotated the tape extending between the nose plate 47 and the rollers 48 and 50 is pulled from the reel 32 over the nose plate 47 at the guide block assembly 46 and then in a direction generally reverse to that of the tape path through station 40 and assembly 46 with the reverse direction having an acute angle to the path through assembly 46 of substantially 40° and an obtuse angle of substantially 320°. Thus the tape follows two paths with the nose plate 47 positioned and sized to form a juncture between the paths whereby each patch 36 will successively separate from the tape 34 when the tape executes the sharp reverse bend at plate 47 adjacent the applicator station 25 and be applied to the passbook at a predetermined position relative the front end and the longitudinal margins or edges of the passbook.

A solenoid 54 located generally above the patch applicator station 25 is secured adjacent the right end of standard 14 as seen in FIG. 1 by means of a bracket and the solenoid has an armature 56 extending downwardly therefrom and shown in its operated position in FIG. 1. The armature 56 is pivotably connected in a slot to one end of a link arm 58 shown in its operated position in FIG. 1. Link arm 58 is pivoted by means of a pin assembly 59 located intermediate the ends of link arm 58 with the pin assembly carried by standard 14. The other end of link arm 58 opposite the end connected to armature 56 rotatably carries a rubber patch affixing roller 60 spaced in opposition to the passbook drive roller 26 when the roller 60 is moved downwardly through the passageway in plate 20.

A pivot pin 62 is provided on the link arm 58 intermediate the link pivot pin assembly 59 and the connection of arm 58 to the armature 56. The pivot pin 62 is connected in a slot to a stop link 64. Stop link 64 is pivotally connected at one end to standard 14 at a position adjacent the right end of the standard 14 and it has a passbook stop 66 at its other end for engaging the leading edge or front end of the passbook 24 at a predetermined position within, for example, 0.015 inches of the lever or actuating arm 28 of switch 30 to ensure that the leading edge of the passbook is accurately positioned relative the nose plate 47.

A drive motor assembly 68 including a constant speed motor is affixed to the standard 14 on the side opposite the reel 32 and solenoid 54 by means of a bracket, and the motor assembly 68 includes a toothed drive belt 70 for engaging suitable identically sized pulleys 72 and 74 connected to rollers 26 and 48 respectively for driving identically sized rollers 26 and 48 at the same speed and through the same distance.

The operation of the system may be seen by reference to FIGS. 1, 6 and 7. The tape 34 is threaded through the photocell assembly 42, and the guide block assembly 46 along one path with each patch on the upper surface of the tape in this one path. The tape is then bent back about the lower portion of the nose plate 47 and extended in a second or other path between rollers 48 and 50 with the tape having the aforementioned reverse direction or bend at the juncture of the two paths. This bend serves to separate the patch 36 and tape 34 since the patch cannot execute the sharp turn at the juncture and the patch and tape will then move in different directions. A patch 36 on the tape in the one path is positioned in between the interruption station 40 and the nose plate 47. The photocell 47*a* of assembly 42 may be used to provide a signal indicating the position of the patch at station 40 or the absence of a patch thereat.

A passbook 24 inserted between the guide rails 18 and 20 and move to the right as seen in FIGS. 1 and 7 is accurately positioned relative the tape and patches by the stop 66 and the opposite margin guides. The front or leading edge of the passbook engages the switch arm 28 to actuate the switch 30, and the passbook then engages and is held by the stop 66. The switch 30 is operated to provide a signal to a control circuit 75 seen in FIG. 6, which after a suitable delay of 300 ms., for example, actuates the solenoid 54. Solenoid 54 energizes to retract its armature 56.

Retraction of the armature 56 pivots link 64 and the stop 66 as indicated by arrow 80 upwardly and the roller 60 on arm 58 downwardly as indicated by arrow 82, to engage the passbook 24 between the rollers 26 and 60 and insure against slippage. The stop 66 pivoting upwardly enables the passbook to be moved by the rollers 26 and 60.

Thereafter under control of circuit 75 providing a second delay of, for example, 300 ms. the motor of assembly 68 is energized by a metered pulse. The motor 68 rotates the drive rollers 48 and 50 to pull the tape 34 and rotates roller 26 to move the passbook 24 to the right as seen in FIGS. 1 and 7. As the tape 34 moves past the juncture at plate 47, the leading edge of the patch 36 adjacent nose plate 47 separates from the tape and moves between the passbook 24 and the upper roller 60 at a shallow angle of engagement as indicated by the dashed lines in FIG. 7. The roller 60 applies pressure to the patch for adhering the same to the passbook 24.

The rollers 48 and 50 serve to draw the tape from reel 32 and eliminate the need for a windup reel, since the tape may be discarded as it exits from the machine. In the meantime, the rollers 26 and 60 move the passbook 24 together with patch 36 in adherence therewith and properly positioned relative the front and open ends of the book from between the rollers and to the right of station 25 where it is removed.

As the tape 34 moves through a selected distance, under control of the metered pulse energizing motor 68, a succeeding patch 36 is moved between the lamp 47 and cell 47*a*. The photocell now provides a signal to the circuit 75 to maintain the motor 68 energized for moving the tape and the succeeding patch 36 through the selected distance, and as the succeeding patch 36 leaves the interrupter station 40, the rear end thereof passes from between the photocell 47*a* and its light source 47. The photocell 47*a* senses the increased light and now supplies a signal for terminating the operation of solenoid 54 and for terminating the energization of the motor in assembly 68. The succeeding patch is now positioned between the interrupter station 40 in a second predetermined position relative the stop 66 and is located for application to another or succeeding passbook with the rear end of the patch located at the interrupter station adjacent photocell 47*a* as indicated in FIG. 7 so that the patch has a predetermined spacial position or relationship to the stop 66.

Solenoid 54 on de-energizing lifts roller 60 and repositions stop 66 to engage or stop the next passbook 24 at the proper position. Thereafter another passbook engaging switch arm 28 energizes the solenoid and a metered pulse is applied to the motor 68 for moving a succeeding patch through a selected distance and between the lamp and photocell while the one patch positioned between station 40 and the nose plate 47 is applied to the succeeding passbook. Energization of the motor 68 continues until the succeeding patch leaves the interrupter station 40, when cell 47*a* provides a signal to circuit 75 to terminate motor operation. The succeeding patch is now accurately positioned for application to another passbook. It will be noted that each patch is positioned between the interrupter station 40 and the end of nose plate 47, in response to the passage of each patch from between the photocell and lamp and that each successive patch is accurately positioned for application to the next passbook 24 that operates switch 30.

The applicant has therefore provided a patch applicator apparatus or assembly 10 for applying to a respective flat article or passbook 24 one label or patch 36 of a plurality of magnetic patches 36, each releasably carried in a successively spaced position on one surface of an imperforate tape 34. The apparatus 10 includes the mechanical stop means 66 operable for stopping the passbook in a first position as the book moves in one direction and control means including switch 30 and solenoid 54 operated by the passbook in the first position for retracting or disabling the stop to disengage the stop from the passbook and for operating the drive means to move the passbook in one direction past the stop and to simultaneously move the tape.

The drive means, which includes rollers 26 and 60 together with the common motor 68 and toothed belt 70 driving rollers 48, 50, 26 and 60 simultaneously initiates movement of the tape and passbook. The rollers 26 and 48 are of substantially the same size or diameter as are the pulleys 72 and 74 and have the same peripheral velocity to move the passbook and tape at substantially the same velocity with each patch on the tape moved in succession to a second predetermined position where it is sensed by the sensing or control means cell 47*a* to stop the movement of the tape and operate the stop 66 to engage another passbook and stop that book in the first position. The patch second position, where it is sensed by cell 47*a*, has a predetermined spacial relationship to the stop or first position of the passbook.

Each patch is then moved successively past the nose plate 47, which forms a separator station for application of attachment to a respective passbook as the rollers 26 and 60 secure each patch to a respective passbook. The rollers 26 and 60 attach or secure the moving patch to the moving passbook at a selected or predetermined position with knurled roller 26 engaging the bottom surface of the passbook and roller 60 engaging the patch against the passbook under pressure.

The sensing or control means, including cell 47*a*, are provided to operate the stop 66 to stop each passbook and to disable the drive means to stop the movement of the tape and each patch in response to each patch being moved to the second predetermined position between interrupter station 40 and separator station 47 with the rear end of each patch at the interrupter station and adapted to be moved through the separator station for separation from said tape in response to the succeeding movement of said tape. Since the rear end of the patch is sensed, the cell 47*a* and associated lamp may be conveniently disposed some distance from the separator station, where space is more ample. The cell 47*a* also serves to maintain the driving means operated after termination of the metered pulse which initially operates the driving means.

The foregoing is a description of an improved patch applicator assembly whose inventive concepts are believed set forth in the accompanying claims.

What is claimed is:

1. Applicator apparatus for applying one label of a plurality of labels each carried in a successive position on a tape to a flat article moving in one direction, the improvement comprising:

Mechanical stop means operable for engaging said article to stop said article in a first position when said article is moved in said one direction toward said stop means;

drive means operable for thereafter moving said article in said one direction and for simultaneously moving said tape carrying said labels at substantially the same velocity;

sensing means operated responsive to said one label being moved to a second position having a predetermined spacial relationship to said first position to disable said drive means and stop said one label in said second position;

positioning means, operated by said sensing means, for positioning said stop means to engage and stop said article at said first position in response to the position of a label at a second predetermined position having a predetermined spacial relationship to said first position;

control means operated by said article in said first position for retracting said stop means from engagement with said article and for operating said drive means to simultaneously move said tape and said article at substantially the same velocity, said article moved by said drive means in said one direction from said first position past said stop means and said one label moved by said drive means from said second position toward said article and means for separating said moving one label from said tape to apply said one label to said moving article while said tape and article are moved at said same velocity.

2. The applicator apparatus claimed in claim 1 in which said control means includes a sensing device for sensing said article in said first position and a solenoid operated by said sensing device for retracting said stop means from engagement with said article, and said drive means includes a motor energized by a metered pulse for moving both said tape and said article.

3. The applicator apparatus claimed in claim 2 in which said solenoid is operated a predetermined time period after said sensing device is operated by said article in said first position.

4. The applicator apparatus claimed in claim 3 in which said drive means comprises a pair of rollers for moving said flat article, and said operated solenoid engages one roller of said pair against said label to apply said label to said article and to enable movement of said article by the other roller.

5. The applicator apparatus claimed in claim 4 in which said drive means includes a third roller for moving said tape with said other roller and third roller moved at the same peripheral velocity by said energized motor.

6. In the applicator apparatus claimed in claim 3, means for energizing said motor a selected time period after said solenoid is operated.

7. The applicator apparatus claimed in claim 2, in which said sensing means maintains said motor energized after termination of said metered pulse.

8. The apparatus claimed in claim 7 in which said sensing means includes a photocell providing a signal for terminating operation of said motor in response to the movement of the rear end of each patch past said photocell.

9. The apparatus claimed in claim 8 in which said labels are magnetic patches each comprising a magnetic oxide having an adhesive in continuous engagement with said tape when each patch is in said second position and said article comprises a passbook.

10. The apparatus claimed in claim 9, in which said apparatus includes a guide for engaging one longitudinal edge of said passbook, and a spring biased guide engaging another longitudinal edge of said passbook for controlling the position of said passbook relative a respective patch in a direction transverse to said one direction.

11. Apparatus for applying a label or the like to a flat article comprising:

guide means for guiding the movement of the flat article along a given path;

movable mechanical stop means in juxtaposition to said guide means for engaging said article at a predetermined position along said given path to restrict further motion thereof;

sensing means in juxtaposition to said path for sensing said article at said predetermined position;

means responsive to said sensing means and coupled to said stop means for moving said stop means out of engagement with said article to permit movement of said article past the position of said stop means further along said given path;

drive means in juxtaposition to said guide means operable to move said article past the position of said stop means further along said given path when said stop means is moved out of engagement with said article;

label means operable to apply one of a plurality of labels carried by a support tape to said article as said article is moved by said drive means;

means operated by said label means for positioning said stop means to engage and stop said article at said predetermined position in response to the positioning of a label at a second predetermined position having a predetermined spacial relationship to said first position; and means coupled to said sensing means for operating both said drive means and label means to cause a label to be applied to said article as said article is moved past the position of said stop means further along said given path.

12. The applicator apparatus claimed in claim 11 in which said sensing means is effective to operate said label means for applying said one label to said article.

* * * * *